Sept. 8, 1931.  W. DODD  1,822,340
AUTOMOBILE COMPASS
Filed March 3, 1930
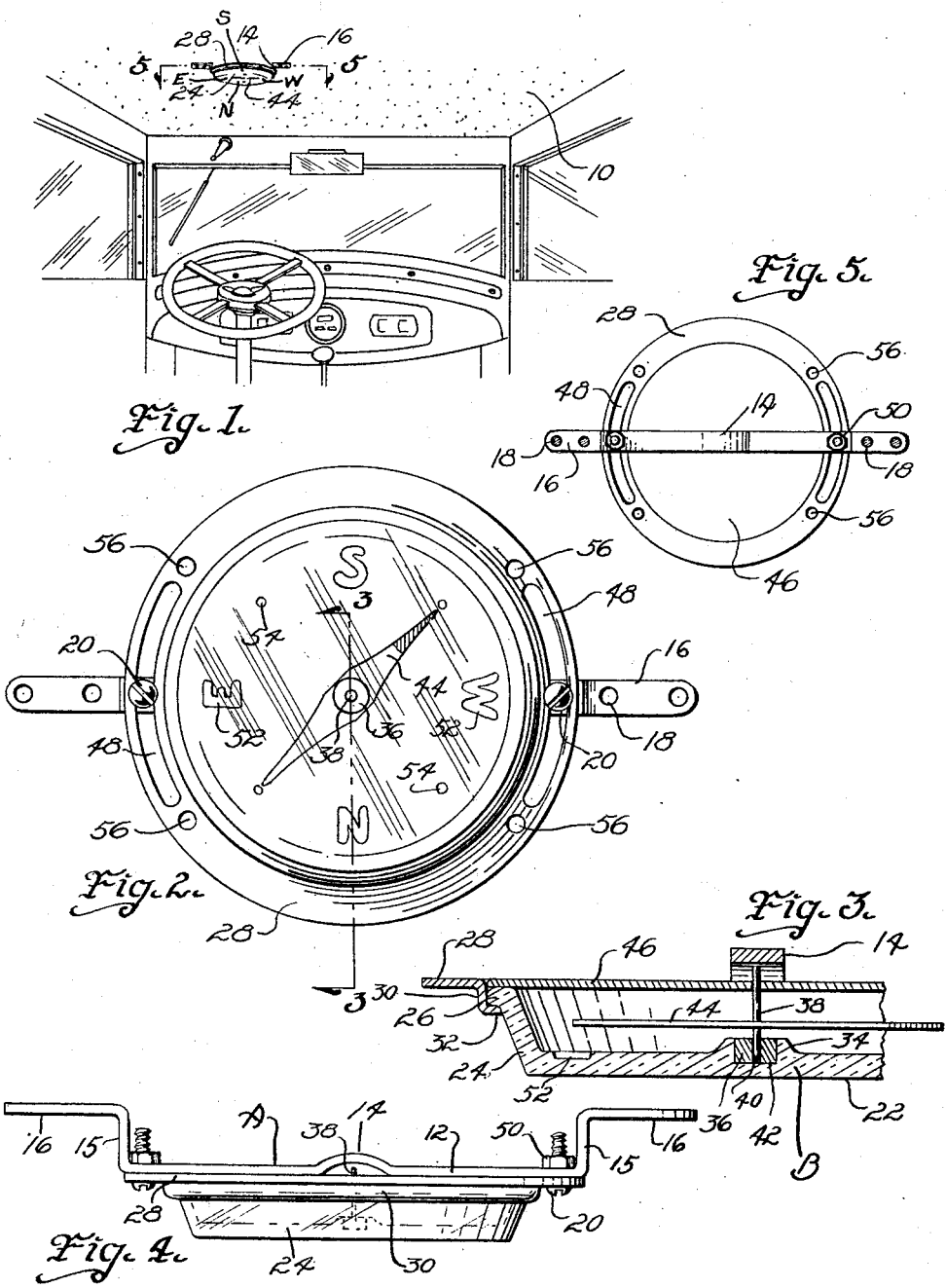

Patented Sept. 8, 1931

1,822,340

UNITED STATES PATENT OFFICE

WEST DODD, OF DES MOINES, IOWA

AUTOMOBILE COMPASS

Application filed March 3, 1930. Serial No. 432,703.

The object of my invention is to provide an automobile compass of very simple construction.

More particularly, it is my purpose to provide such a compass which can be mounted in the top of a motor vehicle for conveniently indicating the direction in which the vehicle is traveling.

It is my purpose in this connection to provide a novel, simple and inexpensive construction and arrangement and combination of parts of the compass.

Still a further object is to provide a manner of mounting the compass so that the dial thereof may be adjusted to regulate the compass in accordance with the declination of the needle from true north. This adjustment can be made without removing the compass from the car.

Still another purpose is to provide such an arrangement of the parts that the reading on the portion of the dial to which the compass points will always indicate the direction in which the car is traveling.

With these and other objects in view, my invention consists in the construction, arrangement and combination of the various parts of my automobile compass, whereby the objects contemplated are attained, as hereinafter more fully set forth, pointed out in my claims, and illustrated in the accompanying drawings, in which:

Figure 1 is a perspective view of a portion of the interior of an automobile with my improved automobile compass installed therein.

Figure 2 is a plan view of the compass as viewed from below when the compass is installed in the car.

Figure 3 is a detail, sectional view taken on the line 3—3 of Figure 2.

Figure 4 is a side elevation of the compass; and

Figure 5 is a plan view illustrating the relation of the supporting bracket to the compass frame, the view being taken on the line 5—5 of Figure 1.

In the accompanying drawings, I have used the reference numeral 10 to indicate the top of the car as viewed from the inside.

In describing the compass, I will describe the parts as though the compass were in position installed in the car.

For mounting the compass on the car, I employ a bracket A having a cross member indicated by the reference numeral 12 in the form of a flat bar. The bar 12 has at its central portion an upward bend 14 to provide clearance for the compass needle supporting post. Of course, a very slight change in the structure would make it possible to eliminate this bend.

At each end of the bar 12 is an upstanding part 15 terminating in a laterally extending bracket arm 16. The bracket arms 16 are provided with holes 18 through which screws may be inserted for mounting the bracket on the top frame of the car as shown in Figure 1.

The bracket bar 12 has near its ends holes to receive screw bolts 20 by which the compass proper is mounted on the bracket.

My compass case consists of a transparent casing member B preferably of clear crystal in the form of a central disc member 22, and the upwardly and outwardly inclined annular flange 24 terminating in the outwardly projecting annular shoulder 26.

A non-magnetic annular rim 28 has a downwardly inclined annular flange 30 terminating in an in-turned annular flange 32. The flanges 30 and 32 fit over and around the shoulder 26 in the manner best illustrated in Figure 3.

In the upper surface of the disc 22 at the center thereof is a small boss 34 in which is set a suitable bushing 36. The rotary compass supporting post 38 extends through the hole 40 in the bushing 36 and rests on the smooth crystal surface at the bottom of the recess 42 in which the bushing seats. The needle 44 is fixed to the post 38 in the ordinary way.

The upper part of the compass casing is closed by an annular disc 46 of non-magnetic material which seats against the flange 24 snugly within the rim 28 (Figure 3). The rim 28 is provided with diametrically opposite curved slots 48.

In installing the compass on the bracket, the screw bolts 20 are usually inserted through the slots 48, as illustrated for instance in Figures 2 and 4 and are held in position by nuts 50. The bar 12 of the bracket A then holds the disc 46 in place. The disc 22 forms a dial on the upper inner surface of which are the indicating characters 52 for showing directions, preferably cast in the crystal for permanence, convenience and beauty. The outside of the crystal is left clear and smooth. I have thus provided a transparent crystal compass case, with dial characters cast on the inside, to be between the needle and the observer. The disc 46 might be provided with dial characters. There may be provided also additional indicating means such as dots. The characters 52 are so arranged that when the compass is properly installed in its normal inverted position as shown in Figure 1 with the "N" toward the front of the car, the needle will always point toward the character which indicates the direction in which the car is headed. Thus if the car is traveling west, the indicating character "W" will be north in the direction which the compass points.

It will have been noticed that by loosening the nuts 50, the compass can be rotated with relation to the bracket A. This is done on account of the differences in the declination of the compass needle at different points in the earth's surface. If the user of a car is traveling somewhere near the "agonic line", the compass should be set so that when the car is headed north, the compass will point toward "N". If on the other hand, one should be driving in Denver, the screw bolts 20 should be loosened and the compass rotated until the character "N" is in line with the needle when the car is headed toward the north magnetic pole. The holes indicated at 56 for example indicate where the screw bolts 20 should be placed for travel in Greenland and Alaska.

The compass can thus be adjusted for accuracy according to the location where the automobile is being used.

The advantages of a compass of this kind are, of course, largely obvious from the foregoing description. The compass is of simple and inexpensive construction and will always indicate to the driver the direction in which he travels, in such a way as to cause him a minimum of inconvenience in determining his direction. On account of the structure herein described, the compass will not be injured by the vibration of the car.

Some changes may, of course, be made in the details of the construction and arrangement of the parts of my automobile compass without departing from the true spirit of the invention.

I claim as my invention:

1. In a compass of the kind described, a transparent casing having a plane surface, a circumferential flange inclined relative thereto and terminating in a circumferential outer shoulder, a ring-like compass frame member having at its inner edge a downturned flange with a terminal in-turned annular flange, said latter flanges engaging the shoulder on the transparent casing, said transparent casing having dial characters and a central socket with a smooth bottom formed in its inner surface, a bushing inset in said socket, a compass needle supporting post journaled in said bushing and resting upon said smooth bottom, a compass needle on said post, and an annular disc resting on the upper part of the shoulder of said casing within said ring-like compass frame and a bracket having a cross member secured to said compass frame and extending across the compass for holding the transparent casing in place, said bracket having projecting parts adapted to be secured to the top of a car.

2. In a compass, a transparent casing member having a flat portion and a circumferential upturned flange terminating in a circumferential outwardly projecting shoulder, a frame having flanges for receiving said shoulder, a disc resting against said first flange, a bracket secured to said frame having a cross bar extending across the compass for holding the disc in place, and a compass needle suitably mounted between said casing and disc.

3. In a compass, a transparent casing member having a flat portion, a circumferential flange inclined relative thereto terminating in a circumferential outwardly projecting shoulder, a frame having flanges for receiving said shoulder, a disc resting against said first flange, a bracket secured to said frame having a cross bar extending across the compass for holding the disc in place, and a compass needle suitably mounted between said casing and disc, said bracket having projecting members for attaching it to the top of a car.

4. In a compass, a transparent casing member having a plane surface and a circumferential upturned flange terminating in a circumferential outwardly projecting shoulder, a frame having flanges for receiving said shoulder, a disc resting against said first flange, a bracket secured to said frame having a cross bar extending across the compass for holding the disc in place, and a compass needle suitably mounted between said casing and dial, said frame having opposite elongated curved slots and fastening means extending from said bracket through said slots, said fastening means being adjustable for providing for the adjustment to different positions in the slots.

5. In a compass, a transparent casing member having a circumferential up-turned flange terminating in a circumferential outwardly projecting shoulder, a frame having flanges for receiving said shoulder, a disc resting against said first flange, a bracket secured to said frame having a cross bar extending across the compass for holding the disc in place, and a compass needle suitably mounted between said casing and disc, the bracket being rotatable relative to the compass frame to permit it to be adjusted to different positions rotatably thereof and means for securing it in any adjusted position.

6. In a compass, a transparent casing member having a circumferential up-turned flange terminating in a circumferential outwardly projecting shoulder, a frame having flanges for receiving said shoulder, a disc resting against said first flange, a bracket secured to said frame having a cross bar extending across the casing, frame and disc for holding the disc in place, said frame being rotatably adjustable relative to said bracket, and a compass needle suitably mounted between said casing and disc, said compass having indicating characters thereon so arranged that when the compass is properly installed in the car and is properly adjusted on its bracket, the needle will always point to the indicating character showing the direction in which the car is going.

Des Moines, Iowa, February 25, 1930.

WEST DODD.